Patented Jan. 8, 1946

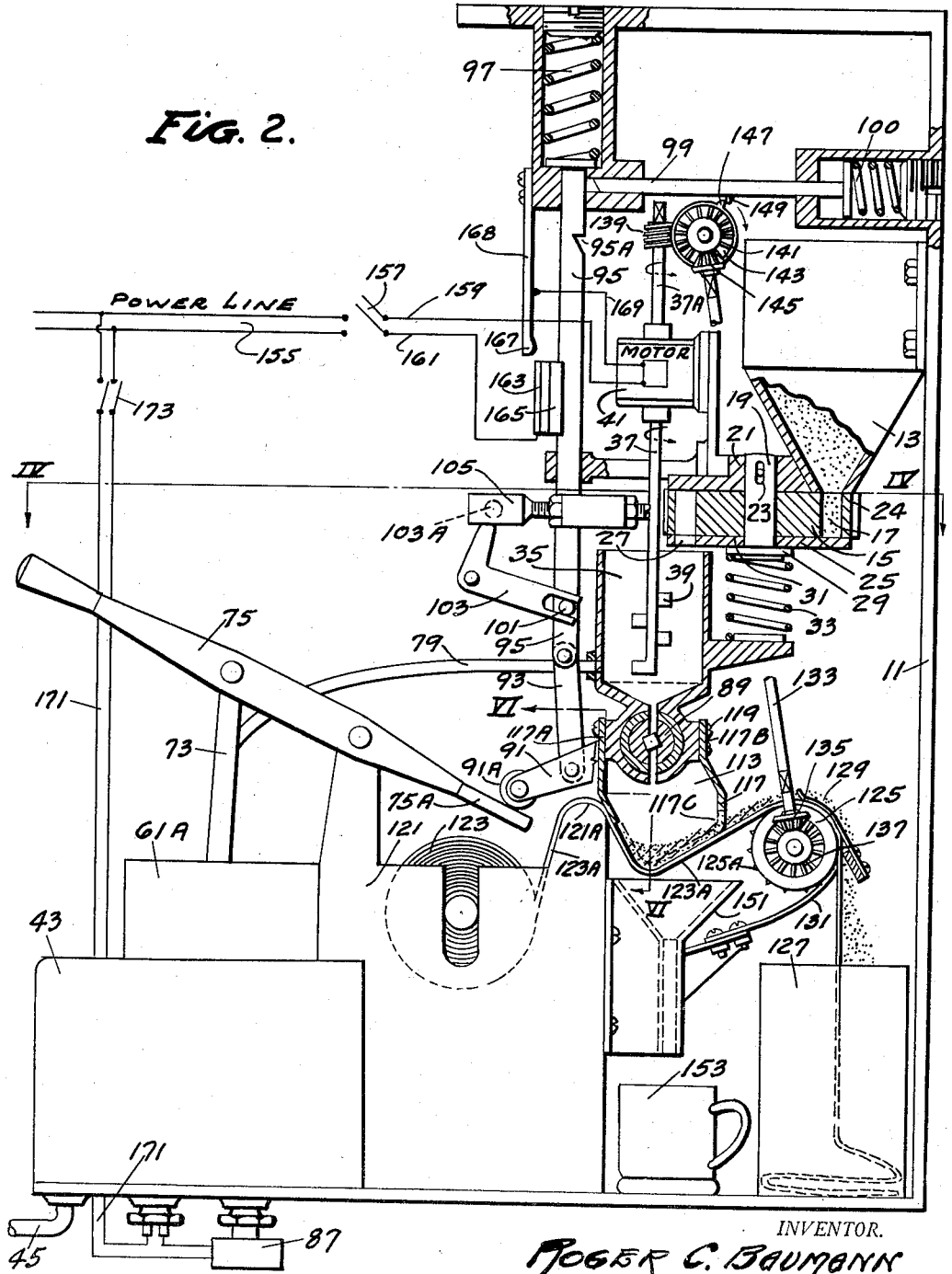

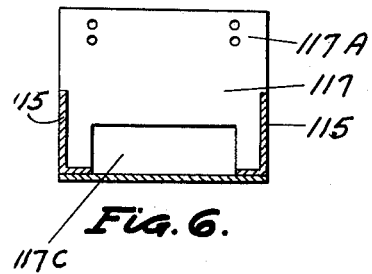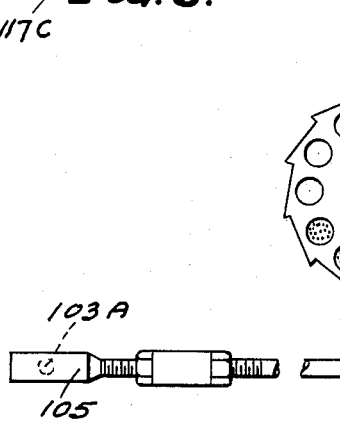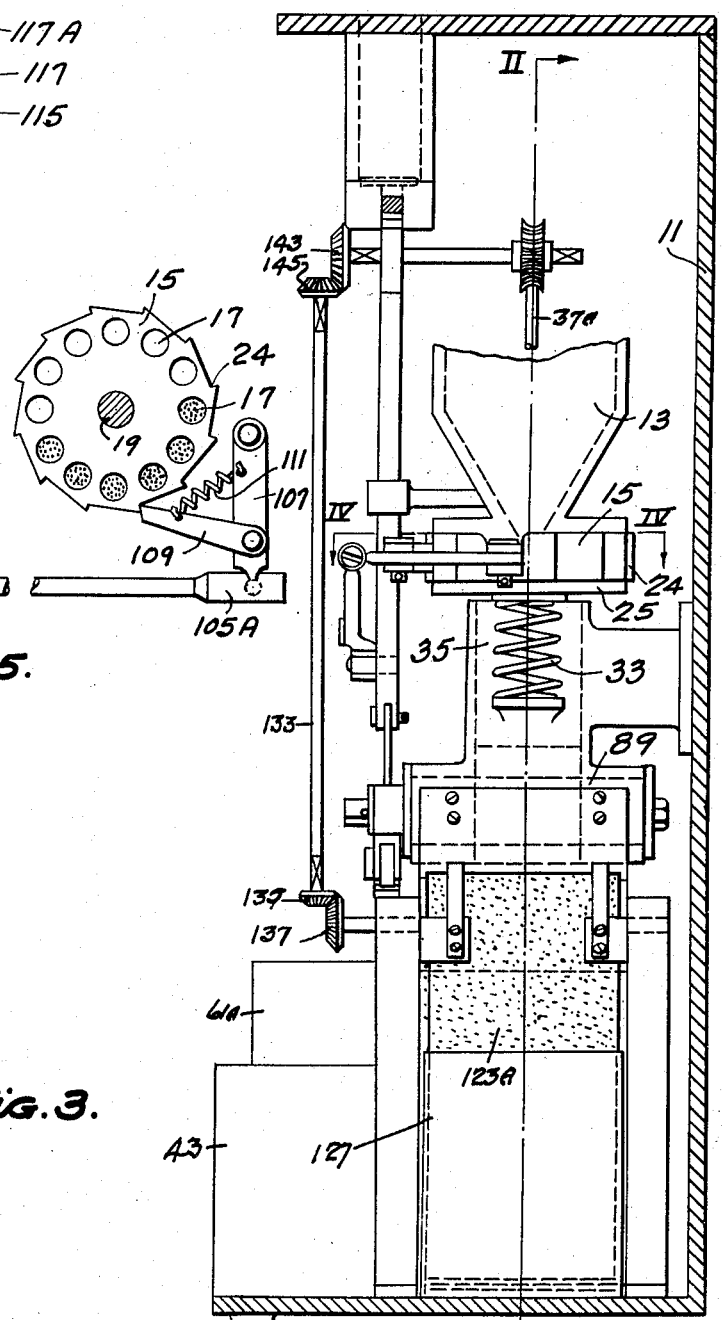

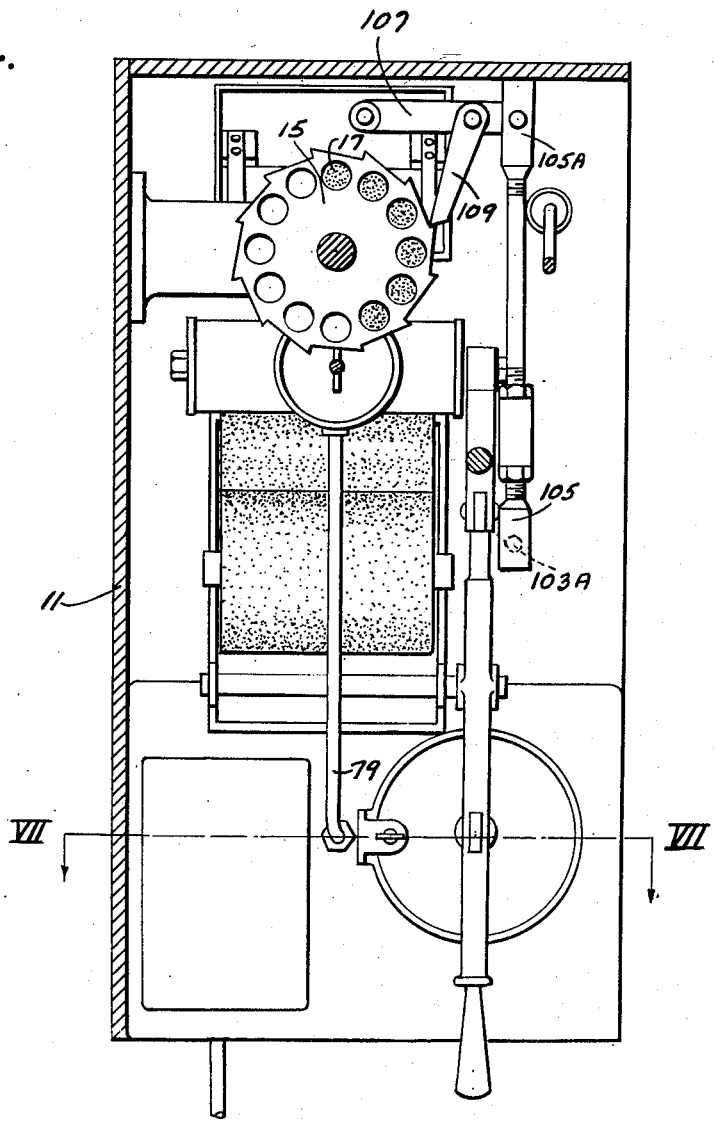

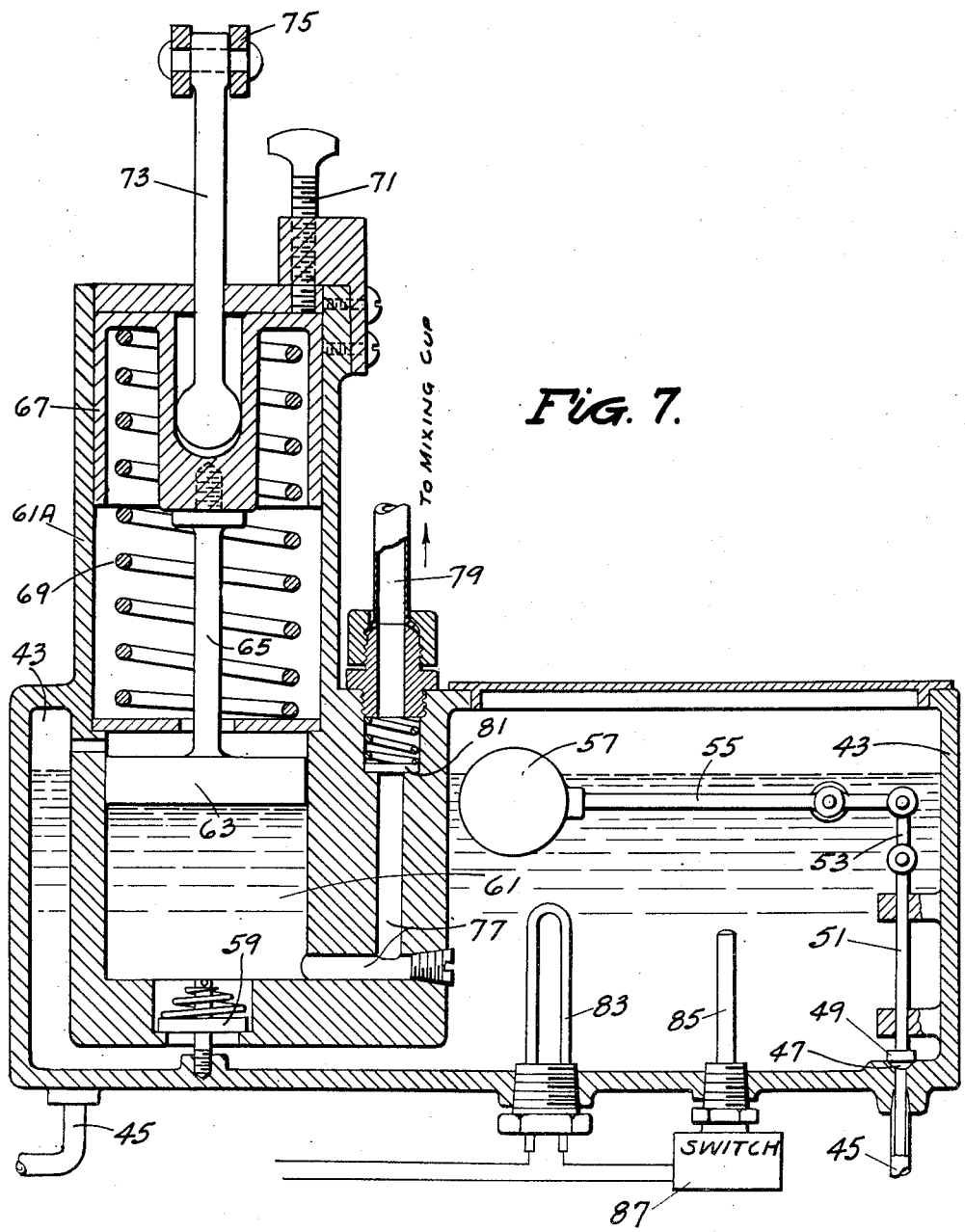

2,392,452

UNITED STATES PATENT OFFICE 2,392,452

LIXIVIATING MECHANISM

Roger C. Baumann, West Memphis, Ark.

Application November 18, 1943, Serial No. 510,734

6 Claims. (Cl. 99—289)

This invention relates to apparatus for lixiviating granular material, and particularly to such an apparatus for brewing coffee or other beverages in restaurants or other establishments, using comparatively large quantities of beverage.

At the present time coffee is largely made in quantity or is kept hot until used, the result usually being that the first cups drawn off are usually weak and the last used coffee has become flat and much less palatable than it should be.

The objects of the invention are:

To provide means for making coffee of uniform strength and at uniform temperature;

To provide means for making coffee in individual units of a single cup;

To provide means for adjusting the strength of the coffee from time to time;

To provide means for mechanically performing the various operations and making the necessary measurements, whereby the variations in measurement from cup to cup due to human fallibility are substantially eliminated.

A further object is to reduce the labor element necessary and minimize waste of materials.

In accomplishing these objects means are provided for measuring out the quantity of coffee needed to make a single cup of desired strength and for automatically repeating this measuring operation for each succeeding cup, and provision is made for changing the measuring device should it be desired to increase or decrease the strength desired. Provision is also made for concurrently measuring out the necessary amount of water for each cup, for adjusting the amount of water from time to time, for maintaining the water at the desired temperature, and for coordinating the measuring of the coffee and the feeding in of the water.

The means by which the objects set out, and other objects, will readily be understood from the following specification upon reference to the accompanying drawings, in which:

Fig. 2 is a corresponding elevation with various of the parts shown in section to disclose interior detail.

Fig. 3 is a corresponding end elevation.

Fig. 4 is a sectional plan taken as on the line IV—IV of Fig. 2; and

Fig. 5 is a fragmentary plan showing certain of the parts disclosed in Fig. 4.

Fig. 6 is a fragmentary sectional elevation taken on the line VI—VI of Fig. 3, showing the filter guide and support; and Fig. 7 is an enlarged sectional elevation taken on the line VII—VII of Fig. 4.

Figure 1:
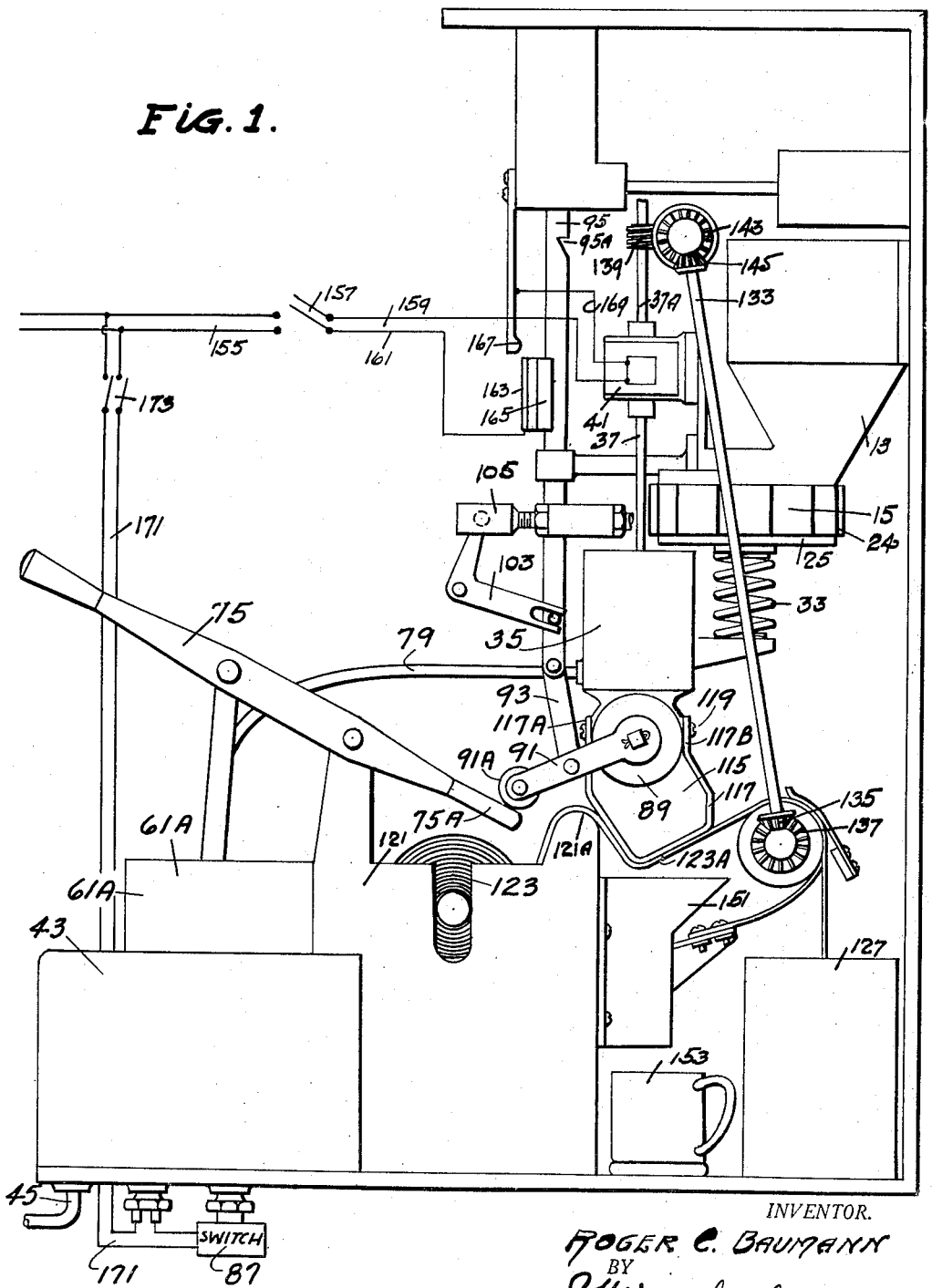
Fig. 1 is a front elevation of the completed mechanism.

Referring now to the drawings in which the various parts are indicated by numerals:

11 is a frame which partially encloses and which supports the various parts of the mechanism. 13 is a hopper for granular material, carried by the frame. Underlying the hopper is a cylindrical magazine 15 having therein a plurality of pockets 17, open top and bottom, each of which pockets is adapted to hold a charge of granulated material suitable for making a solution of desired strength, as a cup of coffee. The magazine 15 is journalled about a pin 19 which is slidably supported by a bracket 21 and is prevented from turning relatively thereto by a transverse pin 23. Magazine 15 has external ratchet teeth 24 corresponding in number to the pockets 17.

Underlying the magazine is a plate 25 having a single aperture or port 27 which permits discharge of granulated material from such one of the pockets 17 as may be alined thereover. The pin 19 has a head 29 which underlies the plate 25 and carries a dowel 31 engaging the plate and holding it against turning. The head of the pin 19 is held against the plate 25 by a compression spring 33 to effect support of the plate and the magazine 15 thereabove.

It will be noted that the pin 19 is slotted for the transverse pin 23, making it possible to remove the magazine and substitute shallower or deeper ones to vary the magazine capacity, this capacity also being variable by increase or decrease of the diameter of the pockets 17 therein.

Underlying the discharge port 27 of the plate 25 is a mixing chamber 35 into which the granulated material discharges. Depending into the chamber 35 is a shaft 37 carrying agitating blades 39, the shaft being driven by an electric motor 41 at a high rate of speed.

43 is a tank for liquid which is supplied through a pipe 45 from a suitable source, not shown. The pipe 45 terminates in a valve seat 47 (Fig. 7) with which cooperates a valve 49 opened and closed through a stem 51, link 53, and lever arm 55 by a float 57, which is responsive to the level of the liquid in the tank 43. From this tank liquid is drawn through a valve 59 into a pump cylinder 61, from which cylinder it is discharged by a hand-operated piston 63. Piston 63 is connected through a rod 65 to a cross head 67 which is slidably mounted in an upward extension 61A of the cylinder 61, the head and piston being resiliently urged into raised position by a compression spring 69, and the stroke of the head and piston being governed by a set screw 71 which may be adjusted to limit upward movement of the head. The head is depressed through a link 73, by a lever 75, which is manually operated, the link having lost motion to permit a limited movement of the lever before depression of the piston begins. Liquid is discharged from the cylinder 61 through passageways 77 and a tube 79 into the mixing chamber 35 on depression of the pump piston, return flow being prevented to the pump chamber by a spring urged valve 81.

Also mounted in the tank 43 are an electric heating coil 83, and a thermostat 85 which controls a switch 87.

Underlying the mixing chamber 35 is a valve 89 which is opened and closed through an arm 91, this arm preferably carrying a roller 91A which rests on an extension 75A of the lever 75 and being shifted by depression of the lever 75 to effect closure of the valve 89.

The arm 91 is coupled by a link 93 to a vertically slidable rod 95 to effect shift of the arm 91 and the valve 89 to open position, the rod being downwardly urged against such shift by a spring 97. The rod is provided with a notch 95A which is adapted, when the rod is raised by valve closing movement of the arm 91, for engagement by a latch bar 99, urged into latching engagement by a spring 100, to hold the rod in raised position and the valve in closed position until disengagement of the latch bar is effected.

The rod 95 carries a pin 101 which is engaged by the fork end of a bell crank lever 103. The opposite end of the bell crank lever carries a ball 103A which seats in a suitable socket in a link 105, the link in turn being connected through a suitable socket 105A with a ball on the end of an arm 107. Arm 107 carries a dog 109 which engages the notches 24 of the chamber 15, being urged into such engagement by a spring 111 (Fig. 5).

Movement of the rod 95 upward on depression of the arm 75, acting through the bell crank lever 103, the link 105, arm 107, and dog 109, shifts the magazine 15 one tooth space and shifts a pocket 17 of the magazine into alinement with the port 27, permitting discharge into the mixing chamber 35 of the granular material in such pocket.

Disposed below the valve 89 is a filter chamber 113, into which the mixing chamber 35 discharges through the valve 89 when same is opened. The chamber 113 has end walls 115 and a filter guide wall 117 spanning from end wall to end wall, the wall 117 preferably being of sheet metal bent roughly into U-shape to form a filter guide. The upper ends 117A and 117B of the U legs are secured to the casing of the valve 89, as by screws 119, and the bight of the U is largely cut away (Fig. 6) to form a discharge opening 117C. 121 is a container in which is disposed a roll 123 of filter cloth, paper or other suitable filtering material, the filter 123A being led from this roll upward over a suitable supporting part 121A of the housing, thence downward beneath and around the underside of the filter guide 117 and the opening 117C therein, and again upward to and over a drum 125 by which it is withdrawn from the roll, and from which drum it is released into a suitable receptacle 127. The drum may have teeth 125A and the filter be held thereagainst by spring clips 129 to promote gripping engagement with drum. 131 are stripper blades insuring release of the filter from the drum, the blades lying between the teeth 125A, and also acting to clean the drum. Drum 125 is driven by a shaft 133 through a bevel pinion 135 and gear 137. Shaft 133 is driven by an extension 37A of motor shaft 37, through a worm 139, worm gear 141, bevel gear 143, which may be an integral part of the gear 141, and a pinion 145. 147 is a lug on the worm gear 141 which engages a lug 149 on the latch bar 99 to retract same and release the rod 95.

Beverage passing through the filter 123A is collected by a funnel 151 and discharged therethrough into a suitable receptacle, as a coffee cup 153.

The motor 41 is driven by electric current from a suitable source, as a power line 155, 157 being a cut-off switch, and 159, 161 leads from the switch to the motor, the lead 159 extending directly to the motor and the lead 161 to a contact block 163 which is carried by the rod 95 and movable therewith, and is insulated therefrom by suitable insulation 165. The block 163, on upward movement of the rod, effects engagement with a contact 167 carried by a spring bar 168, which is coupled through a lead 169 to the motor to complete the circuit. 171 are leads from the power line through the thermostatically controlled switch 87 to the thermostat 85 and the heating coil 83, this line being preferably independently cut on and off through a switch 173.

Operation

The machine operates on a cycle basis, each cycle brews a certain predetermined quantity of coffee or other beverage. The machine is shown in its rest position. Ground or granulated coffee or other beverage material is charged into hopper 13, and tank 43 is connected through pipe 45 to a source of water pressure, and fills until rise of float 57 effects closure of valve 49 and cut-off of flow. Electric motor 41 and heating coil and thermostat are connected to the power circuit.

Initially current is maintained on the heating circuit until the liquid in the tank is heated to the determined temperature and the thermostat 85, responsive to such heating, cuts the current off. Also initially the one pocket 17 of the magazine 15 which underlies the material hopper is filled with the granulated material. The magazine 15, however, is accessible and may be turned by hand, and additional pockets successively filled and until the first filled pocket lies immediately adjacent the discharge port 27, and the machine is set for operation.

To operate the machine the operator pushes down on the lever 75 until the piston 63 bottoms in the cylinder 61, or the motion is otherwise limited if preferred, this action transferring liquid from the cylinder through the pipe 79 to the mixing chamber 35, and on completion of such movement releases the lever.

In this movement, due to the lost motion of the link 73 with respect to the piston 63, the pumping stroke however, does not start at the beginning of the stroke. Concurrently movement of the lever 75 through the arm 91 shifts the valve 89 into closed position, this closing movement being effected before the pumping movement begins and the fluid discharged into the mixing chamber being thereby retained. Movement of the lever 75 also, through link 93 coupled to the arm 91, shifts the rod 95, and through bell crank lever 103, link 105, arm 107 and dog 109 shifts the magazine 15 to move the pocket 17 immediately adjacent the port 27 in the plate 25, to registering position with the port and discharge therethrough into the mixing chamber, this movement of the magazine also shifting an additional pocket beneath the hopper 13 to receive an additional charge.

Shift of the rod 95 also moves contact 163 into engagement with contact 167 and completes circuit to the motor 41, energizing same and starting turning movement of the stirring rod 37. Motor operation also through wheel 139 and worm wheel completes retracting action of lug 147 or lug 149 and releases latch bar 99 for retaining engagement with notch 95A of rod 95, and subsequent holding of this rod and the interconnected parts during completion of the cycle. Bevel gear 143 is concurrently driven and through pinion 145, shaft 133, pinion 135, gear 137, and drum 125, shifts filter 123A, this action, after the initial operation, removing with the filter the residual layer of granular material or lees retained on the filter.

Operation of the motor 41 continues during the brewing cycle and until the lug 147 as it approaches the end of the cycle engages the lug 149 and retracts the latch bar against the action of spring 100 and releases the rod 95. Rod 95, under pressure of the spring 97, descends, breaking the motor circuit and deenergizing the motor, also through the bell crank lever 103 and link 105 it shifts the dog 109 for engagement with the next ratchet tooth 24 of the magazine 15, and through link 93 and arm 91, opens the valve 89 for discharge of the content of the mixing chamber 35. Also, through the arm 91, the lever 75 is restored to initial position, completing such return movement as has in part been accomplished by the spring 69 of the piston-cylinder assembly.

After motor current is cut off the motor coasts against increasing resistance of spring 100 to movement of dog 149 by dog 147 and is brought to a stop by this resistance as disengagement of the two approaches, setting up substantially the initial conditions shown.

The liquid delivered to the mixing chamber is maintained in highly heated condition in the tank 43 and in the cylinder 61 which is entirely surrounded by the liquid in such tank and is delivered in such condition into the mixing chamber 35. During operation of the motor it is violently agitated by the blades 39 and mixed with the granular material, and on opening of the valve the mixture thus formed discharges into the filter chamber 113, the liquid beverage passing through the filter into the cup 153 and the lees being retained on the filter, with and by which it is removed during the next succeeding operation, and a clean filter section substituted.

It will be understood that the set screw 71 may be adjusted to limit the return movement accomplished by the spring 69 and thereby adjust the effective volume of the cylinder 61. Also thicker magazines, or one having larger pockets therein, may be substituted for the magazine 15 to increase the granular material charge, or thinner magazines and/or those having smaller pockets may be substituted to reduce such charge, and with any given motor speed the ratio of the worm 139 and worm gear 141 may be varied to effect desired timing periods.

It will also be understood that numerous changes may be made in the details of the mechanisms by which the various movements and coordinations thereof are effected, without departing from my invention, and that I do not intend such details to be limiting or governing except where the context of a claim so requires.

I claim:

1. A lixiviating mechanism including a holder for granular material, a supply tank for liquid solvent, a steeping chamber having a discharge valve, means for receiving charges of granular material from said holder, and for transferring said charges singly to said chamber, means for agitating materials in said chamber, means for filtering solution discharged from said chamber, and removing residual lees remaining on said filter; a source of electric current, an electric motor operatively coupled to said agitating means, a normally open circuit from said source to said motor, timing mechanism, gearing operatively coupling the shaft of said motor to said timing mechanism and to said lees removing mechanism; manually operable means for closing said discharge valve, and for closing said circuit to energize said motor, resilient means urging return of said valve and circuit means to respective open and non-operating positions, means operatively coupled to said manual means, for measuring and delivering solvent from said tank to said mixing chamber, means operatively coupling said manual means to said transferring means, means for latching said valves and circuit means in respective closed and operating positions, and means forming part of said timing means for releasing said latching means on completion of a predetermined cycle of operation of said motor.

2. A lixiviating mechanism including a holder for granular material, a supply tank for liquid solvent, means for heating solvent in said tank, a steeping chamber having a discharge valve, means for receiving charges of granular material from said holder, and for transferring said charges singly to said chamber, means for agitating materials in said chamber, means for filtering solution discharged from said chamber, and removing residual lees remaining on said filter; a source of electric current, an electric motor operatively coupled to said agitating means, a normally open circuit from said source to said motor, timing mechanism, gearing operatively coupling the shaft of said motor to said timing mechanism and to said lees removing mechanism; manually operable means for closing said discharge valve, and for closing said circuit to energize said motor, resilient means urging return of said valve and circuit means to respective open and non-operating positions, means operatively coupled to said manual means, for measuring and delivering solvent from said tank to said mixing chamber, means operatively coupling said manual means to said transferring means, means for latching said valve and circuit means in respective closed and operating positions, and means forming part of said timing means for releasing said latching means on completion of a predetermined cycle of operation of said motor.

3. A lixiviating mechanism including a holder for granular material, a supply tank for liquid solvent, a steeping chamber having a discharge valve, means for receiving charges of granular material from said holder, and for transferring said charges singly to said chamber, means for agitating materials in said chamber, means including a filter belt and a withdrawing drum for filtering solution discharged from said chamber, and removing residual lees remaining on said filter; a source of electric current, an electric motor operatively coupled to said agitating means, a normally open circuit from said source to said motor, timing mechanism, gearing operatively coupling the shaft of said motor to said timing mechanism and to said withdrawing drum; manually operable means for closing said discharge valve, and for closing said circuit to energize said motor, resilient means urging return of said valve and circuit means to respective open and non-operating positions, means operatively coupled to said manual means, for measuring and delivering solvent from said tank to said mixing chamber, means operatively coupling said manual means to said transferring means, means for latching said valve and circuit means in respective closed and operating positions, and means forming part of said timing means for releasing said latching means on completion of a predetermined cycle of operation of said motor.

4. A lixiviating mechanism including a holder for granular material, a supply tank for liquid solvent, a steeping chamber having a discharge valve, means for measuring and delivering charges of granular material from said holder singly to said chamber, means for filtering solution discharged from said chamber, and removing residual lees remaining on said filter; a source of electric current, an electric motor, a normally open circuit from said source to said motor, timing mechanism, gearing operatively coupling the shaft of said motor to said timing mechanism and to said lees removing mechanism; manually operable means for closing said discharge valve, and for closing said circuit to energize said motor, means urging return of said valve and circuit means to respective open and non-operating positions; means operatively coupled to said manual means, for measuring and delivering solvent from said tank to said mixing chamber, means operatively coupling said manual means to said delivering means, means for latching said valve and circuit means in respective closed and operating position, and means forming part of said timing means for releasing said latching means on completion of a predetermined cycle of operation of said motor.

5. A lixiviating mechanism including a holder for granular material, a supply tank for liquid solvent, a steeping chamber having a discharge valve, means for measuring and delivering charges of granular material from said holder singly to said chamber, means for filtering solution discharged from said chamber; a source of electric current, an electric motor, a normally open circuit from said source to said motor, timing mechanism, gearing operatively coupling the shaft of said motor to said timing mechanism; manually operable means for closing said discharge valve, and for closing said circuit to energize said motor, means urging return of said valve and circuit means to respective open and non-operating positions, means operatively coupled to said manual means, for measuring and delivering solvent from said tank to said mixing chamber, means operatively coupling said manual means to said delivering means, means for latching said valve and circuit means in respective closed and operating position, and means forming part of said timing means for releasing said latching means on completion of a predetermined cycle of operation of said motor.

6. A lixiviating mechanism including a holder for granular material, a supply tank for liquid solvent, a steeping chamber having a discharge valve, means for receiving charges of granular material from said holder, and for transferring said charges singly to said chamber, means for agitating materials in said chamber, means for filtering solution discharged from said chamber; a source of electric current, an electric motor operatively coupled to said agitating means, a normally open circuit from said source to said motor, timing mechanism, gearing operatively coupling the shaft of said motor to said timing mechanism; manually operable means for closing said discharge valve, and for closing said circuit to energize said motor, means urging return of said valve and circuit means to respective open and non-operating positions, means operatively coupled to said manual means, for measuring and delivering solvent from said tank to said mixing chamber, means operatively coupling said manual means to said transferring means, means for latching said valve and circuit means in respective closed and operating position, and means forming part of said timing means for releasing said latching means on completion of a predetermined cycle of operation of said motor.

ROGER C. BAUMANN.